July 21, 1931.  C. W. ROBINSON  1,815,331
POWER ACTUATED AGRICULTURAL IMPLEMENT
Filed July 23, 1930   4 Sheets-Sheet 1
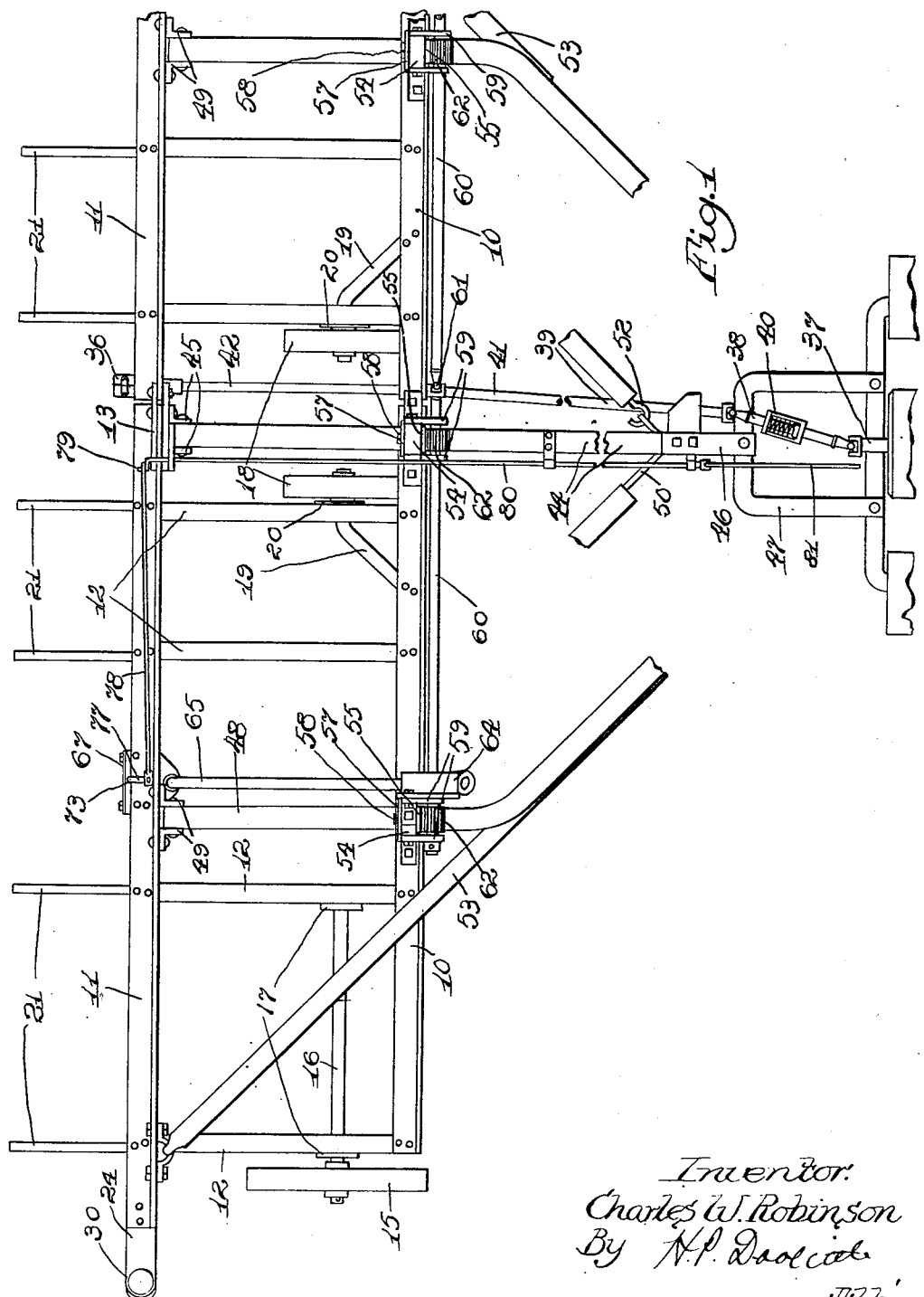
Inventor:
Charles W. Robinson
By N. P. Doolcot
Atty.

July 21, 1931.    C. W. ROBINSON    1,815,331
POWER ACTUATED AGRICULTURAL IMPLEMENT
Filed July 23, 1930    4 Sheets-Sheet 2
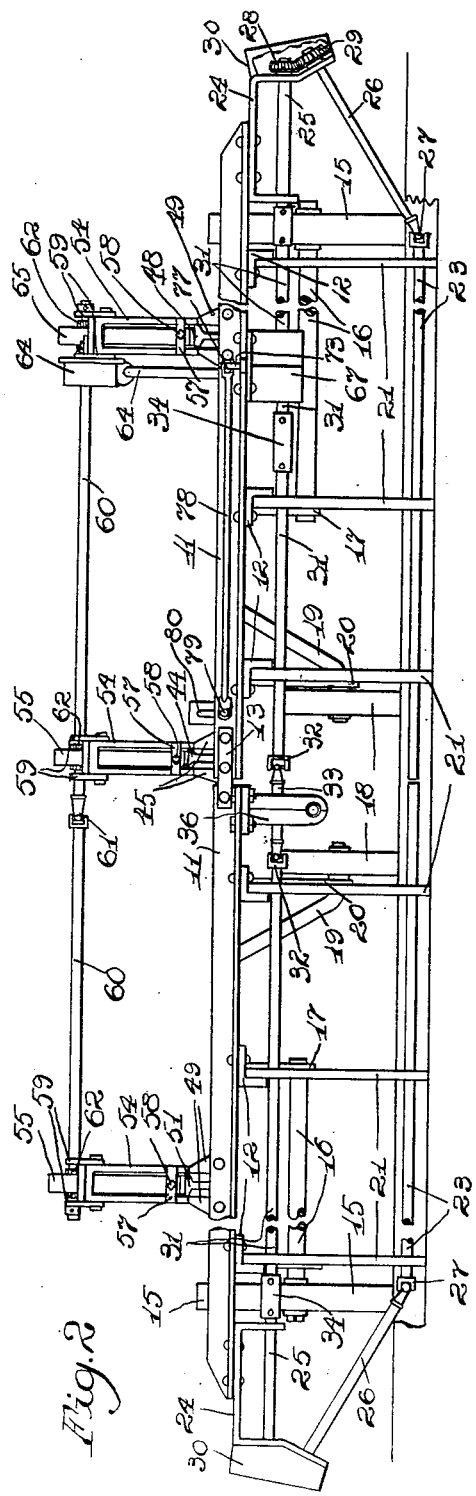
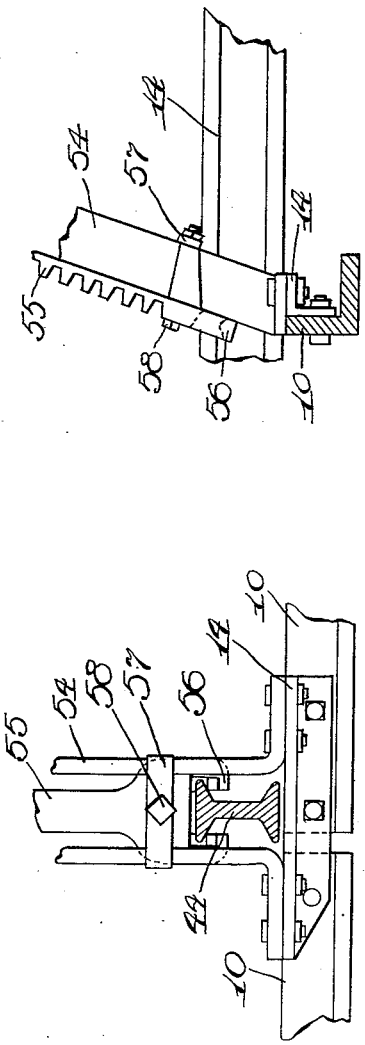
Inventor.
Charles W. Robinson
By ____ Atty.

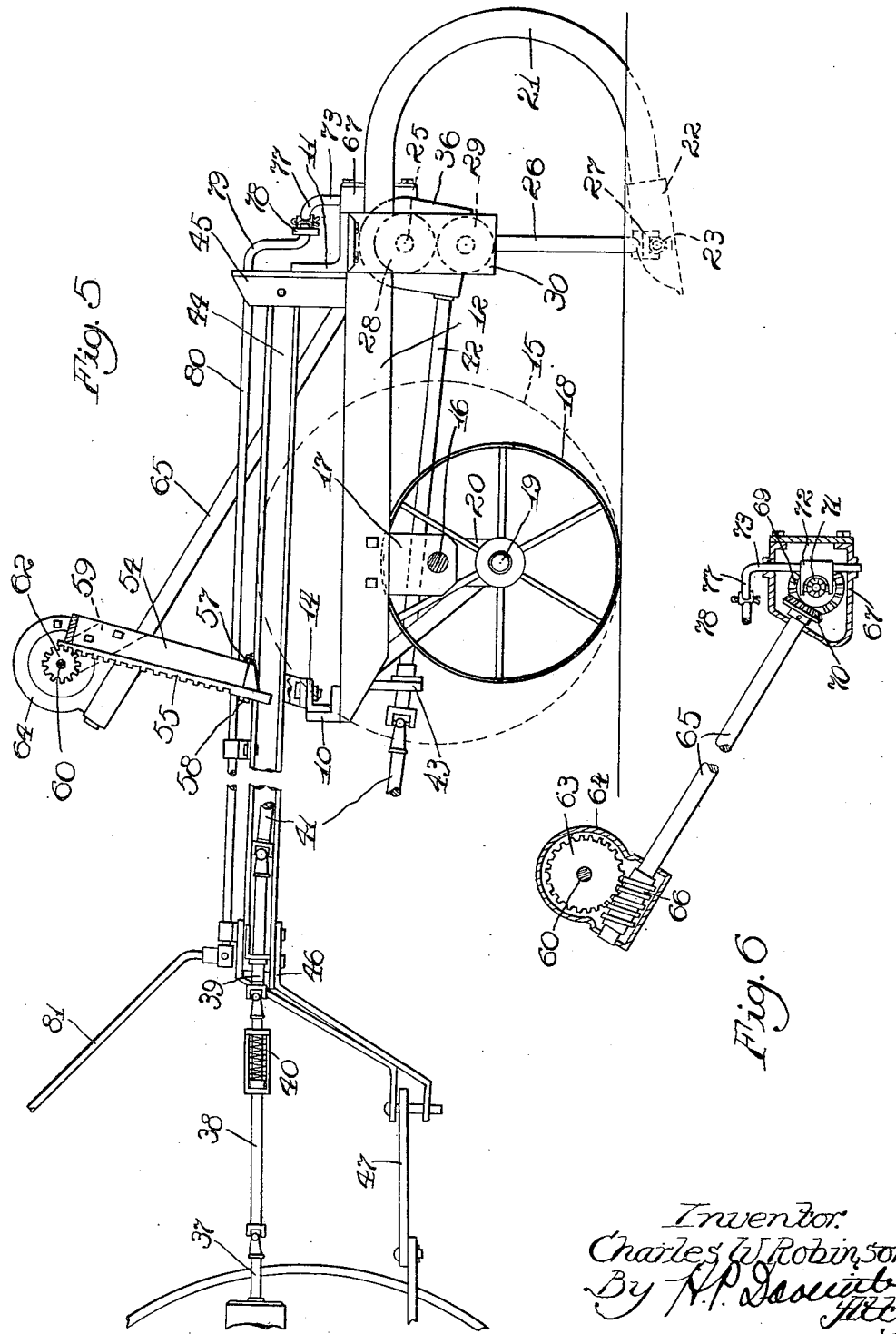

Patented July 21, 1931

1,815,331

UNITED STATES PATENT OFFICE

CHARLES W. ROBINSON, OF HAMILTON, ONTARIO, CANADA, ASSIGNOR, BY MESNE ASSIGNMENTS, TO INTERNATIONAL HARVESTER COMPANY, OF CHICAGO, ILLINOIS, A CORPORATION OF NEW JERSEY

POWER ACTUATED AGRICULTURAL IMPLEMENT

Application filed July 23, 1930. Serial No. 470,213.

This invention relates to a rotary rod weeder. More particularly it relates to a rod weeder adapted to be drawn and operated by a tractor.

The principal object of the invention is to provide an improved means for driving the moving parts of a rod weeder from the power take-off shaft at the rear of a tractor.

Another primary object is to provide improved means for lifting and lowering the weeding rods into and out of operative position.

Another object is to provide a rod weeder having a jointed frame structure whereby such a device may be constructed in long lengths.

Other objects and the means by which they are accomplished will be apparent from the following detailed description.

In the drawings:

Figure 1 is a plan view showing the major portion of a rod weeder embodying the invention;

Figure 2 is a rear elevation of the same device;

Figures 3 and 4 are enlarged details of portions of the lifting mechanism;

Figure 5 is an end elevation of the device shown in Figures 1 and 2, with the weeding mechanism in operative position;

Figure 6 is a sectional detail, showing a portion of the drive for the lifting mechanism;

Figures 7, 8:
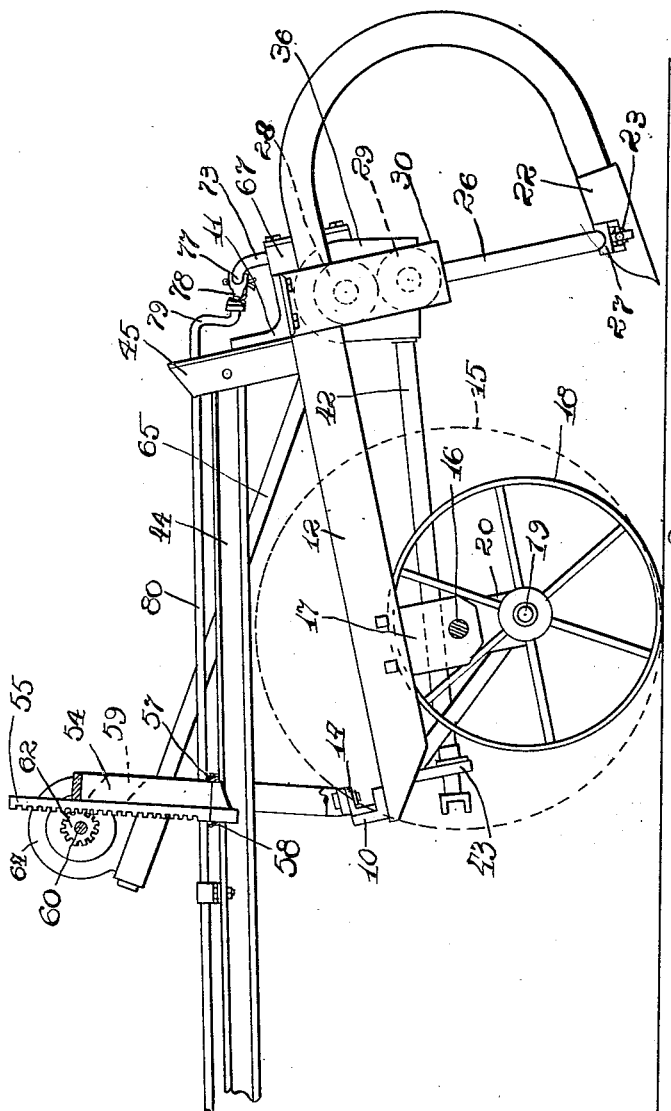
Figure 7 is an elevation of the device shown in Figure 1 with the weeding mechanism in lifted or inoperative position; and, Figure 8 is an enlarged detail showing a clutch mechanism for engaging the lifting means.

The mechanisms for driving the weeding rods are mounted on a frame structure consisting of angle bars rigidly secured together. The frame structure is hinged at the middle, as will be hereinafter described in detail, and each section is provided with a rolling support at each end. Each section of the frame structure has a front frame bar 10, a rear frame bar 11, and a series of spaced cross-bars 12 rigidly secured to the bars 10 and 11. As best shown in Figure 2, the rear bars 11 of the two frame structure sections are pivotally secured together by a bar 13, which is rigidly secured to one of the bars 11 and pivotally secured to the other. The front bars 10 are similarly secured together, as shown in Figure 3, by an angle bar 14. The angle bar 14 also serves as a support for an element of the lifting means, as will hereinafter be described.

At the outer end of each section of the frame structure, a wheel 15 rotatably mounted on an axle 16 is secured in position by brackets 17, which are secured to the crossbars 12. At the adjacent ends of the sections, rolling supports are formed by wheels 18 mounted on the ends of bars 19 which are secured to the frame structure. A bracket 20 serves as an additional means for supporting the bar 19.

At the rear of the frame structure, a plurality of U-shaped beams 21 extend rearwardly and downwardly to form shanks for supporting a ground engaging shoe 22. The beams 21 are rigidly secured at their upper ends to the crossbars 12 of the frame structure. The shoes 22 form supports and bearings for weeder rods 23. In the particular embodiment of the invention illustrated, there are two weeder rods, each extending from the end and terminating adjacent each other near the central part of the device. At each end, each of the weeder rods is driven in exactly the same manner. A bracket 24 rigidly secured to the rear frame bar 11 forms supports and bearings for a horizontal shaft 25 and a downwardly extending shaft 26, which is connected by a universal joint 27 to the weeder rod 23. Bevel gears 28 and 29 mounted on the ends of the shafts 25 and 26 are adapted to engage and to drive the shaft 26 and the weeder rod 23. An encasing housing 30 is provided for enclosing the gears 28 and 29. The two shafts 25 at the opposite ends of the frame structure are in alignment and are connected by shafts 31 and universal joints 32 with the opposite ends of a power delivering shaft 33, which is driven from the power take-off of the tractor, as will be hereinafter described. Coupling sleeves 34 nonrotatively join the shafts 35 and 31. These sleeves provide means for detaching the power drive connections and for attaching sprockets for receiving power from the ground wheels 15 when desired.

The means for receiving power from the tractor consists of a gear housing 36 secured to the frame structure and suitable driving shafts. The tractor power take-off shaft 37 is connected by a shaft 38 and universal joints to a shaft 39 mounted on the draft frame of the weeder. The draft frame will be described in detail in connection with the lifting means. A slip clutch 40 is provided intermediate the ends of the shaft 38. The shaft 39 is connected by a shaft 41 and universal joints to a shaft 42. The shaft 42 is mounted in a bearing bracket 43 at the front of the frame structure and extends rearwardly through the gear housing 36. The gear housing encloses gears of a conventional construction, not shown, a worm being provided on the shaft 42, and a gear on the shaft 33.

A draft frame is hinged to the rear of the frame structure and extends forwardly beyond the frame structure. The draft frame is made up of a series of bars pivotally connected to the frame structure. A central bar 44, I-shaped in cross section as best shown in Figure 3, is pivotally connected by brackets 45 at one end of one of the rear frame structure bars 11. At its front end, the beam 44 is rigidly clamped between draft bars 46, which are bent downwardly, as shown in Figure 5, and spaced apart at their lower ends to form a clevis for attaching the weeder to the drawbar 47 of the tractor. A second I-beam 48 is pivotally connected to the same rear frame bar 11 by brackets 49. Forwardly of the front bar 10 of the frame structure, the I-beam 48 is bent inwardly and is connected by a draft element 50 to the central beam 44. A second beam 51, exactly similar to the beam 48, is pivoted to the other section of the frame structure and is connected by a swivel of a draft element 52 to the central beam 44. This swivel connection provides for angular movement of the two sections of the frame structure with respect to each other about an axis in the line of draft. Additional bars 53 are connected to the ends of the frame bars 11 and to the I-beams 48 and 51 to form an additional draft means. The beams 44, 48 and 51 and the associated parts form a draft frame, which is hinged to the frame structure along the rear side thereof. The front of the draft frame is secured to the tractor drawbar against vertical movement. It is, therefore, evident that any angular movement between the draft frame and the frame structure alters the vertical position of the rear frame structure. The lifting means provides for such movement, thereby forming means for adjusting the depth of the weeder rods below the surface of the soil and for lifting the rods out of operative position.

A guide member 54 is provided for each of the draft beams. The two end guide members 54 are attached directly to the frame bars 10. The central guide member for the draft beam 44 is secured to the angle bar 14 which joins the two bars 10. Each of the bars 54 has two upwardly extending, parallel sides connected at the top, and lateral extensions at the bottom, which form means for rigidly securing them in place. A rack bar 55 is provided with inturned flanges 56, which are adapted to be slid over the I-beams. The bottom portions of the rack bars 55 are wider than the spacing of the side portions of the guide members 54, as best shown in Figure 3. Said portions abut against the edges of said members on one side and are prevented from being displaced therefrom by bars 57, which are positioned on the opposite sides of the members 54 and secured to the rack bars 55 by bolts 58. It will be understood that the rack bars 55 extend substantially vertically along the front of the guide members 54. As best shown in Figure 5 in the extreme low position, the upper end of the rack bar extends beyond the top of the guide member 54.

Angularly extending brackets 59 are rigidly secured to the upper ends of the guide members 54. Said brackets provide bearings for a shaft 60. As shown in Figures 1 and 2, the shaft 60 is provided with a universal joint 61 intermediate its ends, to provide for hinging action of the frame sections. Gears 62 are non-rotatively mounted on the shaft 60 in position to engage the racks 55. A gear 63, shown in Figure 6, is also non-rotatively mounted on the shaft 60. A housing 64 encloses the gear 63 and provides bearings for a shaft 65 on which a worm 66 is mounted in the housing for engagement with the gear 63. The shaft 65 extends angularly downwardly into a housing 67, which is secured to one of the frame bars 11. The main driving shaft 31, which operates the weeding rods, passes through the housing 67. As best shown in Figure 8, bevel gears 68 and 69 are rotatively mounted in spaced relation on the shaft 31. A bevel gear 70 mounted on the end of the shaft 65 is adapted to engage both of said gears 68 and 69, thereby rotating said gears in opposite directions. A sleeve 71 is keyed to the shaft 31 for axial movement with respect thereto. An actuating collar 72, mounted on a shaft 73 extending through the housing 67 is operative to reciprocate said sleeve axially. At each end of the sleeve 71, ratchet teeth 74 are provided and are adapted to engage mating teeth 75 provided on the inner hub of the gear 68 and teeth 76 provided on the inner hub of the gear 69. It will be understood that by this construction, assuming that shaft 31 is continuously rotated in one direction, the shaft 65 may be rotated in either direction by selectively engaging the sleeve 71 with the gears 68 and 69.

The shaft 73, for operating the engaging collar, has a crank extension 77 to which a link 78 is attached, as best shown in Figure 1. The link 78 is in turn connected to a crank 79 on the end of a shaft 80, which extends forwardly along the draft beam 44. At the forward end, an actuating lever 81 is provided for oscillating the shaft 80.

The operation of the various units of this device has been explained in connection with the description. Power transmitted from the tractor power take-off shaft, through the shafts 38, 39, 41 and 42, drives the shaft 33 by means of the gears contained in the housing 36. From the shaft 33 power is transmitted to the shafts 31 and 25, the gears 28 and 29, and the shafts 26 to weeder rods 23. The universal joints provided at the ends of the shaft 33 allow hinging of the frame structure sections to allow the weeder to pass over uneven ground.

Reversible transmission, shown in detail in Figure 8, the operation of which has already been described, provides means for rotating the shaft 65 in either direction at the will of the operator. From the shaft 65, through the worm 66 and the gear 63, the shaft 60 is rotated. The gears 62 mounted on the shaft 60 engage the racks 55 and raise or lower the draft beams 44, 48 and 51 in the guide members 54. As shown in the lifted position in Figure 7, when the draft frame is raised with respect to the front of the frame structure, the back side of the frame structure is raised, thereby lifting the weeding rods. This adjustment may be used to vary the depth at which the weeding rods operate under the surface of the soil or for raising the rods completely out of operative position. This latter position is shown in Figure 7.

It is to be understood that applicant has shown only a preferred embodiment of his improved device and that he claims as his invention any modification falling within the scope of the appended claims.

What is claimed as new is:

1. A rotary rod weeder comprising a supporting frame structure, beams attached to said structure and rotatably supporting a weeder rod, a driving shaft mounted on the frame structure, means for operatively connecting said shaft and the weeder rod, a draft frame hinged to the frame structure, said frame extending forwardly and being adapted to be secured to a tractor drawbar, means for adjusting the relative angular position of the frame structure and the draft frame whereby the position of the weeder rod with respect to the soil level may be adjusted, and power transmitting means adapted to be connected to a tractor power take-off and connected to said adjusting means and the driving shaft.

2. A rotary rod weeder comprising a supporting frame structure provided with rolling supports, rod supporting beams extending downwardly from said structure, a weeder rod rotatably mounted on said beams, a driving shaft mounted on the frame structure, means for rotating the weeder rod operatively connected to said driving shaft, means for operating the driving shaft from a tractor power take-off, a draft frame hinged on the frame structure, said frame extending forwardly and adapted to be secured to a tractor drawbar, means for adjusting the angular position of the draft frame with respect to the frame structure, and means for operating the adjusting means through the driving shaft mounted on the frame structure.

3. A device as set forth in claim 2, in which the means for altering the relative angular position of the draft means with respect to the frame structure is provided with manually operable means for increasing and decreasing at will the relative angular distance of said elements.

4. A device as set forth in claim 2, in which the means for altering the relative angular position of the draft frame with respect to the frame structure consists of upstanding rack bars attached to the frame structure, and rotatable means on the frame structure adapted to engage and reciprocate said bars.

5. A device as set forth in claim 2, in which a plurality of upstanding rack bars are attached to the frame structure and means are provided for engaging and reciprocating said bars, said means consisting of a shaft mounted on the frame structure, gears mounted on said shaft and adapted to operatively engage the rack bars, and an operative connection between said shaft and the driving shaft on the frame structure.

6. A device as set forth in claim 2, in which a transmission mechanism is provided in the means for altering the relative angular position of the draft frame with respect to the frame structure, said transmission being provided with means effectively to increase and decrease the relative angular distance of the frame structure and the draft frame whereby the weeder rod may be lowered into and lifted out of operative position.

7. A rotary rod weeder comprising two frame sections hinged together end to end, rolling supports for each of said sections, a draft means connected to said sections and adapted to be mounted on a drawbar, means on each section adapted to support a weeder rod for rotation adjacent the ground level, aligned driving shafts mounted on the sections, the adjacent ends thereof being connected by a universal joint whereby relative angular movement of the sections is provided for, means for operatively connecting the outer ends of the driving shafts to the outer ends of the weeder rods, and means for rotating said driving shafts.

8. A rotary rod weeder comprising two frame sections hinged together end to end, rolling supports for each of said sections, a draft frame hinged thereto, means on each section adapted to support a weeder rod for rotation adjacent the ground level and rearwardly of the axes of the rolling supports, said draft means being hinged to the sections rearwardly of the axes of the rolling supports and extending forwardly therefrom, aligned driving shafts mounted on the sections, the adjacent ends thereof being connected by a universal joint whereby the sections may have angular movement with respect to each other, means for operatively connecting the outer ends of the drive shafts to the outer ends of the weeder rods, and means for rotating said driving shafts.

9. A device as set forth in claim 8, in which means are provided for adjusting the relative angular positions of the frame sections and the draft frame whereby the position of the weeder rods with respect to the ground level may be adjusted.

10. A device as set forth in claim 8, in which power actuated means adapted to be operatively connected to the power take-off of a tractor are provided for adjusting the relative angular position of the frame sections and the draft frame.

In testimony whereof I affix my signature.

CHARLES W. ROBINSON.